Patented Jan. 11, 1944

2,339,050

UNITED STATES PATENT OFFICE 2,339,050

IMPROVING THE ODOR OF THIOCYANATE INSECTICIDES

William F. Carson, Jr., Brunswick, Ga., assignor to Hercules Powder Company, Wilmington, Del., a corporation of Delaware No Drawing. Application November 22, 1941, Serial No. 420,102

10 Claims. (Cl. 260—454)

This invention relates to thiocyanate insecticides and more particularly it relates to a method of improving the odor and removing causes of irritation from organic thiocyanates of the type useful in insecticides.

Organic thiocyanates are, in general, highly toxic to insects and of low toxicity to warm blooded animals. Hence, they are promising active agents in contact insecticides such as household fly sprays. However, they suffer from the disadvantage that they are accompanied by a rather unpleasant odor of the sulfurous or mercaptan type. This odor is particularly noticeable and particularly unpleasant in the case of the lower aliphatic thiocyanates. The odor is somewhat less undesirable in the case of thiocyanates of higher molecular weight, but even in the case of organic thiocyanates of relatively high molecular weight, i. e., compounds containing 10 to 20 carbon atoms, the odor mentioned has been sufficient to limit the usefulness of the compounds. Another disadvantage found in the organic thiocyanate insecticides is their tendency to cause irritation in the nasal passage of a person using the insecticide, as, for example, when used as a household fly spray. It is further discovered that the presence of the odor and irritation producing impurities materially affect the biological rating of the insecticide to an undesirable degree.

In accordance with this invention an organic thiocyanate is brought into intimate contact with a dilute aqueous solution of a material which has a relatively high modifying action upon the odorous and irritation producing compound or compounds associated with the organic thiocyanate being treated, and which has a greater modifying action upon the odor-irritation producing compound or compounds than upon the thiocyanate. This treatment results in removal of odorous and irritation producing material from the organic thiocyanate by a modification reaction caused by the treating agent utilized. The treating agent is then separated from the organic thiocyanate. In this manner, the odor and irritation effects of the organic thiocyanate being treated is either altogether eliminated or greatly reduced in intensity.

The organic thiocyanate being treated may be in a concentrated form or it may be in more or less dilute solution in a solvent therefor. In either case, the phase comprising the organic thiocyanate will be treated with a dilute aqueous solution of an agent which has a modifying power for odorous and irritation producing compounds associated with the organic thiocyanate and which is capable of substantial immiscibility with the phase comprising the organic thiocyanate.

The organic thiocyanate which may be improved in accordance with the method of this invention may be any stable organic thiocyanate.

Such thiocyanates may be aliphatic, aromatic, alicyclic, heterocyclic, etc., and they may be hydrocarbon thiocyanates or they may be thiocyanates of organic groups which contain oxygen, nitrogen, sulfur, chlorine, bromine, etc. The method of this invention may, for example, be applied to organic thiocyanates such as hexyl thiocyanate, cyclohexyl thiocyanate, stearyl thiocyanate, oleyl thiocyanate, terpinyl thiocyanate, bornyl thiocyanate, fenchyl thiocyanate, isobornyl thiocyanate, methylcyclohexyl thiocyanate, hexyl thiocyanoacetate, cyclohexyl thiocyanoacetate, octyl thiocyanoacetate, octyl thiocyanopropionate, terpinyl thiocyanoacetate, bornyl thiocyanoacetate, fenchyl thiocyanoacetate, terpinyl thiocyanopropionate, terpinyl thiocyanobutyrate, beta-thiocyanoethyl propionate, beta-thiocyanoethyl thiocyanoacetate, beta-thiocyanoethyl laurate, beta-thiocyanoethyl stearate, beta-thiocyanoethyl benzoate, butyloxyethyl thiocyanate, butyloxyethyl thiocyanoacetate, beta-butoxy-beta'-thiocyanodiethyl ether, glycerol thiocyanate distearate, benzyl thiocyanoacetate, styrol dithiocyanoacetate, glycol dithiocyanoacetate, diphenylamine dithiocyanate, furfuryl thiocyanoacetate, butyl thiocyanate, lauryl thiocyanate, cetyl thiocyanate, and other esters of thiocyanic acid and aliphatic alcohols.

Additional materials which may be treated to improve the odor are: organic thiocyanoacylates, as aliphatic esters of thiocyanoacetic acid, α-thiocyanopropionic acid, beta-thiocyanopropionic acid, thiocyanobutyric acid, etc.

The method of this invention finds its greatest use in connection with improvement of organic thiocyanates, including isothiocyanates. However, it is within the scope of this invention to improve the odor and decrease the irritation effect of organic tellurocyanates and organic selenocyanates of a character similar to the organic thiocyanates hereinbefore described in the same manner. The terms "tellurocyanate" and selenocyanate" are used herein and in the claims in their broad sense which includes the isotellurocyanates and isoselenocyanates respectively.

The organic thiocyanate may be treated by direct contact with a dilute aqueous solution of the odor removing and irritation reducing agent employed or preferably the thiocyanate may be dissolved in a solvent therefor which is capable of substantial immiscibility with the odor removing irritation reducing agent. The thiocyanate may, for example, be dissolved in petroleum ether, liquid propane, liquid butane, liquid isobutane, normal pentane, isopentane, tetramethylmethane, normal hexane, isohexane, heptane, octane, petroleum ether, gasoline, deodorized kerosene, and the like, petroleum hydrocarbons being in general eminently suitable; or the thiocyanate may be dissolved in cyclohexane, cyclohexene, pinene, dipentene, paramenthane, or other solvent of the character mentioned. It has been found that the use of such solvents for the thiocyanate improves the efficiency of the aqueous solution of the deodorizing-irritation reducing treatment and improves or actually brings about the necessary immiscibility between the thiocyanate and the odor removing irritation reducing agent. It will be appreciated that the solvent for the thiocyanate will preferably have a minimum solvent action upon both the deodorizing-irritation reducing agent employed in a dilute aqueous phase and the odorous and irritation producing impurities associated with the organic thiocyanate being purified.

The deodorizing and irritation reducing medium or modifying agent utilized according to the method of this invention is a liquid having a relatively higher modifying action for the odorous and irritation producing compounds associated with the organic thiocyanates than for the thiocyanates themselves. Preferably, it will have a minimum action for the organic thiocyanate but it may possess a moderate action therefor and still be useful for the purposes of this invention. It must, however, be capable of either immiscibility with the organic thiocyanate itself or with a solution of the organic thiocyanate. A number of the substances of the character described have been found to be suitable for the method of this invention; for example, dilute aqueous solutions of water-soluble or sparingly water-soluble amines and/or amides are satisfactory for the purpose of this invention. Dilute aqueous solutions of urea; the sulfur analogs of urea, as, for example, thiourea; substitution products of urea as, for example, phenylurea, ethylurea; alkamines as, for example, ethanolamine, diethanolamine, triethanolamine, morpholine, choline, neurine, muscarine, taurine, pyridine; arylamines, as for example, aniline, amidines of carbonic acid as, for example, guanidine; normal aliphatic amines to about nonylamine and their isomers are found to be satisfactory as deodorizing and irritation reducing agents.

The specific examples of modifying agents as above set forth may be conveniently expressed by means of the following general formula:

wherein Y and Y' represent a substituent selected from the class consisting of alkyl and aryl radicals and hydrogen, and X represents a carbon atom in a substituent selected from the group consisting of organic radicals. It may further be noted that the urea type of modifying agent may be indicated by means of the following general formula:

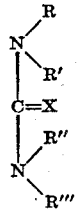

where R, R', R'', and R''' represent a substituent selected from the class consisting of alkyl and aryl radicals and hydrogen, and X represents a substituent selected from the class consisting of oxygen and sulfur.

The method in accordance with this invention is illustrated by the following specific examples. All parts and percentages are by weight unless otherwise specified.

Example 1

In this example, a 100 cc. sample of an insecticide, containing as the toxic ingredient terpene thiocyanoacetate, was washed with a 1% aqueous solution of urea. After the violent agitation of the two solutions to give intimate contact, the terpene thiocyanoacetate phase was allowed to settle and was withdrawn from the separatory funnel used for the agitation. The phase containing the insecticide was dried by heating in vacuum. On using this material in a 5% concentration, it was found that the irritation of the insecticide had materially decreased and the odor was more pleasant than that of the original spray. The biological rating of the insecticide was increased.

Example 2

In this example, a 50 cc. sample of a commercial fly spray composed of essentially 50% beta-butyloxy-beta'-thiocyanodiethyl ether and 50% base oil of a substantial viscosity was washed with a 1% aqueous solution of urea. The two solutions were strongly agitated to permit intimate contact. The resulting mixture was allowed to separate into two phases in a separatory funnel. The phase containing the insecticide was separated and then dried under a vacuum by gentle heating to 75° C. On using this material in a 5% concentration, it was found that the irritation of the insecticide had materially decreased and the odor was more pleasant than that of the original spray. The biological rating of the insecticide was increased.

Example 3

In this example, a 100 cc. sample of an insecticide, containing as the toxic ingredient terpene thiocyanoacetate, was washed with a 1% aqueous solution of thiourea. The two solutions were thoroughly mixed to allow intimate contact. The resulting mixture was allowed to separate into two phases in a separatory funnel. The lower phase containing the improved insecticide was drawn off and dried under a vacuum. On using this material in a 5% concentration, it was found that the irritation of the insecticide had materially decreased and the odor was more pleasant than that of the original spray. The biological rating of the insecticide was increased.

Example 4

In this example, a 100 cc. sample of an insecticide, containing as the toxic agent terpene thiocyanoacetate, was washed with a 1% aqueous solution of phenylurea. The two solutions were violently agitated to permit intimate contact. The resulting mixture was allowed to separate into two phases in a separatory funnel. The lower phase containing the improved insecticide was drawn off and dried by heating under a vacuum. Or using this material in a 5% concentration, it was found that the irritation of the insecticide had materially decreased and the odor was more pleasant than that of the original spray. The biological rating of the insecticide had increased.

Example 5

In this example, a 100 cc. sample of an insecticide, containing as the toxic ingredient terpene thiocyanoacetate, was washed with a 1% aqueous solution of pyridine. The two solutions were vigorously agitated to give intimate contact. The resulting mixture was allowed to separate into two phases in a separatory funnel. The lower phase containing the improved insecticide was drawn off and extensively washed with a dilute acid to remove the pyridine odor and then dried under a vacuum. On using this material in a 5% concentration, it was found that the irritation of the insecticide had materially decreased and the odor was more pleasant than that of the original spray. The biological rating of the insecticide had increased.

*Example 6*

In this example, a 100 cc. sample of an insecticide, containing as the toxic ingredient terpene thiocyanoacetate was washed with a 1% aqueous solution of aniline. The two solutions were agitated to give intimate contact. The resulting mixture was allowed to separate into two phases in a separatory funnel. The lower phase containing the improved insecticide was drawn off and dried under a vacuum. On using this material in a 5% concentration, it was found that the irritation of the insecticide had materially decreased and the odor was more pleasant than that of the original spray. The biological rating of the insecticide had increased.

*Example 7*

In this example, a 100 cc. sample of an insecticide, containing as the toxic ingredient terpene thiocyanoacetate, was washed with a 1% aqueous solution of triethanolamine. The two solutions were violently agitated to give intimate contact. The resulting mixture was allowed to separate into two phases in a separatory funnel. The lower phase containing the improved insecticide was drawn off and dried under a vacuum. In using this material in a 5% concentration, it was found that the irritation of the insecticide had materially decreased and the odor was more pleasant than that of the original spray. The biological rating of the insecticide had increased.

In carrying out the method in accordance with this invention, the organic thiocyanate to be deodorized and the causes of irritation to be removed, is placed in intimate contact with a dilute aqueous solution of the deodorizing irritation reducing agent. Conveniently, the organic thiocyanate either alone or dissolved or diluted with a solvent is agitated preferably in a manner permitting intimate contact with the aqueous solution of treating agent. The quantity of treating agent utilized will be sufficient to bring about the improvement in odor and remove the causes of irritation but will be insufficient to modify the organic thiocyanate. Preferably, the smallest quantity effective to bring about the desired improvement is utilized. In general, a quantity of treating agent between about $\frac{1}{10}$ and about 2 parts for each 100 parts by weight of the organic thiocyanate will be found effective although more or less may be used. After the thiocyanate has been subjected to the treating agent, the formation and separation of two phases is brought about or permitted to occur, for example, by settling and decantation or by centrifuging.

Occasionally it will be found that the extractive agent and the thiocyanate phase do not separate readily. This difficulty is readily remedied by the addition of more extracting agent or by the addition of solvent for the organic thiocyanate or by warming to 50°–60° C. Upon stirring in the additional material and allowing the mixture to stand, the separation into two phases will then be readily obtained.

The method according to this invention may be carried out at any temperature within the range between about −60° C. and about 100° C., preferably between about 20° C. and about 30° C. The temperature at which the washing is carried out is not critical, but when an amine is used in the washing process, it is necessary to use the lower temperatures of the range of about 15° C. to about 60° C.

The treatment of the organic thiocyanate with the dilute aqueous solution of the deodorizing and irritation reducing agent may be repeated. In fact, maximum efficiency of deodorization and irritation reduction of the organic thiocyanate by a given quantity of treating agent is obtained when the treating agent is divided into portions utilized in a plurality of extractive treatments.

It will be appreciated that the method in accordance with this invention is adapted to continuous operation wherein the organic thiocyanate is subjected to the deodorizing and irritation reducing liquid with or without the presence of an auxiliary thiocyanate solvent. The liquid may be continuously mixed with the thiocyanate and the mixture fed to a separator such as a continuous decanter or centrifuge for separation of the resulting phases. The modification process may also be carried out in a countercurrent manner in which a phase comprising the organic thiocyanate is subjected to increasingly pure portions of deodorizing reducing agent while the thiocyanate phase is itself becoming progressively leaner in undesired odorous compounds. This countercurrent method of operation is conveniently carried out continuously by means of a packed or unpacked column in which the dilute aqueous modifying phase and the thiocyanate phase move in opposite directions by virtue of a difference in specific gravity of the two phases. The specific gravity is obviously adjustable within the control of the operator.

The organic thiocyanate phase which has been treated with an odor and irritation reducing agent may dissolve a portion of the agent. This portion of the agent may be removed by vacuum distillation or evaporation in cases where it is volatile or it may be removed by washing with water or other extractant for the material. For example, if a small quantity of urea, pyridine, phenylurea or triethanolamine used as the treating agent is retained by the thiocyanate phase, it may be removed by washing with water; similarly aniline may be removed by washing with a dilute aqueous solution of an acid such as sulfuric acid, hydrochloric acid, etc. and then with water. Thus, moderate solubility of the agent in the thiocyanate phase does not prevent use of the agent.

Water acts in most cases to render the agent more immiscible with the thiocyanate phase. In general, it will be used in a proportion of about 99% by weight of the agent as a means of providing a dilute solution of the agent and as a carrier means for distributing the small amount of agent throughout the mass of thiocyanate solution so that complete contact by the agent with the undesirable compounds may be made. Water itself, or an aqueous solution chiefly consisting of water, is not an extractant for odorous and irritation producing compounds normally accompanying organic thiocyanates according to the method of this invention. Water may be used to remove water-soluble salts, acids, and other materials which might cause instability if left with an organic thiocyanate, but water itself does not operate to remove the odorous and irritation producing compounds.

There does not appear to be any known chemical mechanism relating to how the odor and irritation causes of the thicyanates are removed. However, purely upon a conjectural basis, it is possible that the amines and the amides suitable as treating agents in this invention could condense with the impurities present to form water-soluble products. It is further believed that the odor and irritation producing compounds may be modified in such a manner as to render them non-irritating and odorless in character. In this modified form, the removal of the modified compound from the solution may or may not be made. In any event, whether the modified compound is or is not removed, the resulting solution after treatment with a modifying agent is free of the odor and irritation producing compounds.

The method in accordance with this invention greatly extends the usefulness of organic thiocyanates in the insecticide and pharmaceutical fields. The odor of the material treated is either appreciably decreased or is eliminated altogether. At the same time, there is either a marked decrease in the irritation producing effects of the insecticides or the causes of the irritation are completely removed from the insecticides. There is frequently an improvement in color. It is further noted that the method will not only yield an improved product from the standpoint of odor, irritation, and color, but also give a product of increased biological rating.

What I claim and desire to protect by Letters Patent is:

1. A process for improving the odor and reducing the irritation effect of organic thiocyanates, selenocyanates, and tellurocyanates, which comprises subjecting a phase containing a compound of the group consisting of organic thiocyanates, organic selenocyanates, and organic tellurocyanates, having an odorous and irritation producing compound associated therewith, to the action of an aqueous solution containing an organic compound basic in reaction and having a trivalent nitrogen atom, at least one valence of which is connected directly to a carbon atom, the solution being capable of substantial immiscibility with said phase and having a modifying action upon the odorous and irritation producing compound whereby there results a cyanate containing phase of reduced content of odorous and irritation producing compound and a second phase, and separating the two phases.

2. A process for improving the odor and reducing the irritation effect of organic thiocyanates which comprises subjecting a phase containing an organic thiocyanate having an odorous and irritation producing compound associated therewith to the action of a dilute aqueous solution containing an organic compound basic in reaction and having a trivalent nitrogen atom, at least one valence of which is connected directly to a carbon atom, the solution being capable of substantial immiscibility with said phase and having a modifying action upon the odorous and irritation producing compound whereby there results a thiocyanate containing phase of reduced content of odorous and irritation producing compound and a second phase, and separating the two phases.

3. A process for improving the odor and reducing the irritation effect of organic thiocyanates which comprises subjecting a phase containing an organic thiocyanate having an odorous and irritation producing compound associated therewith to the action of a dilute aqueous solution containing an organic compound basic in reaction and having a trivalent nitrogen atom, at least one valence of which is connected directly to a carbon atom, the solution being capable of substantial immiscibility with said phase and having a modifying action upon the odorous and irritation producing compound whereby there results a thiocyanate containing phase of reduced content of odorous and irritation producing compound and a second phase, separating the two phases, and recovering the organic thiocyanate from the treated thiocyanate phase.

4. A process for improving the odor and reducing the irritation effect of organic thiocyanates which comprises subjecting a phase containing an organic thiocyanate having an odorous and irritation producing compound associated therewith to the action of a dilute aqueous solution comprising a compound having the general formula:

wherein Y and Y' represent a substituent selected from the class consisting of alkyl and aryl radicals and hydrogen, and X represents a carbon atom in a substituent selected from the group consisting of monovalent alkyl and aryl radicals, whereby there results a thiocyanate phase of reduced content of odorous and irritation producing compound and an aqueous phase, and separating the two phases.

5. A process for improving the odor and reducing the irritation effect of organic thiocyanates which comprises subjecting a phase comprising an organic thiocyanate having an odorous and irritation producing compound associated therewith to the action of a dilute aqueous solution comprising a compound having the general formula:

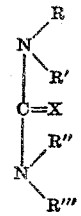

where R, R', R'' and R''' represent a substituent selected from the class consisting of alkyl and aryl radicals and hydrogen, and X represents a substituent selected from the class consisting of oxygen and sulfur, whereby there results a thiocyanate phase of reduced content of odorous and irritation producing compound and an aqueous phase, and separating the two phases.

6. A process for improving the odor and reducing the irritation effect of organic thiocyanates which comprises subjecting a phase comprising an organic thiocyanate and an undesired odorous and irritation producing compound to the action of a dilute aqueous solution of a substitution product of urea, whereby there results a thiocyanate phase of reduced content of odorous and irritation producing compound and a substitution product of urea phase, and separating the two phases.

7. A process for improving the odor and reducing the irritation effect of organic thiocyanates which comprises subjecting a phase comprising an organic thiocyanate and an undesired odorous and irritation producing compound to the action of a dilute aqueous solution of urea, whereby there results a thiocyanate phase of reduced content of odorous and irritation producing compound and urea phase, and separating the two phases.

8. A process for improving the odor and reducing the irritation effect of organic thiocyanates which comprises subjecting a phase comprising an organic thiocyanate and an undesired odorous and irritation producing compound to the action of a dilute aqueous solution of an alkamine, whereby there results a thiocyanate phase of reduced content of odorous and irritation producing compound and an alkamine phase, and separating the two phases.

9. A process for improving the odor and reducing the irritation effect of organic thiocyanates which comprises subjecting a phase comprising an organic thiocyanate and an undesired odorous and irritation producing compound to the action of a dilute aqueous solution of an ethanolamine, whereby there results a thiocyanate phase of reduced content of odorous and irritation producing compound and ethanolamine phase, and separating the two phases.

10. A process for improving the odor and reducing the irritation effect of organic thiocyanates which comprises subjecting a phase comprising an organic thiocyanate and an undesired odorous and irritation producing compound to the action of a dilute aqueous solution of aniline, whereby there results a thiocyanate phase of reduced content of odorous and irritation producing compound and an aniline phase, and separating the two phases.

WILLIAM F. CARSON, Jr.